(12) United States Patent
Takai et al.

(10) Patent No.: US 7,520,683 B2
(45) Date of Patent: Apr. 21, 2009

(54) OPTICAL MODULE

(75) Inventors: Toshiaki Takai, Yokohama (JP); Kenji Yoshimoto, Yokohama (JP); Hiroyasu Sasaki, Yokohama (JP); Masanobu Okayasu, Yokohama (JP); Naoki Matsushima, Yokohama (JP)

(73) Assignee: Opnext Japan, Inc., Kanagawa (JP)

( * ) Notice: Subject to any disclaimer, the term of this patent is extended or adjusted under 35 U.S.C. 154(b) by 321 days.

(21) Appl. No.: 11/195,663

(22) Filed: Aug. 3, 2005

(65) Prior Publication Data

US 2006/0056780 A1      Mar. 16, 2006

(30) Foreign Application Priority Data

Sep. 6, 2004    (JP) ............... 2004-257978

(51) Int. Cl.
  G02B 6/36   (2006.01)
  H04B 10/06  (2006.01)
(52) U.S. Cl. ........................ 385/92; 398/212
(58) Field of Classification Search ................ 385/92; 398/212
  See application file for complete search history.

(56) References Cited

U.S. PATENT DOCUMENTS

| 5,737,467 A * | 4/1998 | Kato et al. ............. 385/92 |
| 5,924,290 A * | 7/1999 | Yoshino ................. 62/3.7 |
| 6,504,653 B2 * | 1/2003 | Matthae et al. ........ 359/656 |
| 6,821,030 B2 * | 11/2004 | Fukuda et al. .......... 385/92 |
| 2002/0009265 A1 | 1/2002 | Ichigi |

FOREIGN PATENT DOCUMENTS

| JP | 63-229427 | 9/1988 |
| JP | 11-064689 | 3/1999 |
| JP | 11-218648 | 8/1999 |
| JP | 2000-150745 | 5/2000 |
| JP | 2001-15635 | 1/2001 |
| JP | 2001-272572 | 10/2001 |
| JP | 2003-179296 | 6/2003 |
| JP | 2003-273437 | 9/2003 |
| JP | 2003-295142 | 10/2003 |

OTHER PUBLICATIONS

"AN 120 Aluminum Nitride Ceramic Substrate, 98% Purity", Data Sheet, available at www.matweb.com.*

(Continued)

*Primary Examiner*—Jerry T Rahll
(74) *Attorney, Agent, or Firm*—Antonelli, Terry, Stout & Kraus, LLP.

(57) ABSTRACT

To provide a small-sized and reliable optical module in which a light emitting element and an optical function element respectively remarkably different in a coefficient of thermal expansion are mounted in the same casing, in the invention, the optical function element is mounted on the casing made of first material substantially equal in a coefficient of thermal expansion to the optical function element, a light emitting element unit including the light emitting element (for example, a thermoelectric module over which the light emitting element is mounted) is mounted on a member (base material) made of second material different from the first material and matched with the light emitting element unit in a coefficient of thermal expansion, and the member is, for example, embedded in the bottom of the casing.

6 Claims, 9 Drawing Sheets

OTHER PUBLICATIONS

"Indium Phosphide, InP", Data Sheet, available at www.matweb.com.*

"Silicon, Si", Data Sheet, available at www.matweb.com.*

"TIE-32: Thermal Loads on Optical Glass", Advanced Optics, Schott North America, Aug. 2004, available at www.us.schott.com/optics_devices/english/download/tie-32_thermal_loads_on_optical_glass_us.pdf.*

* cited by examiner

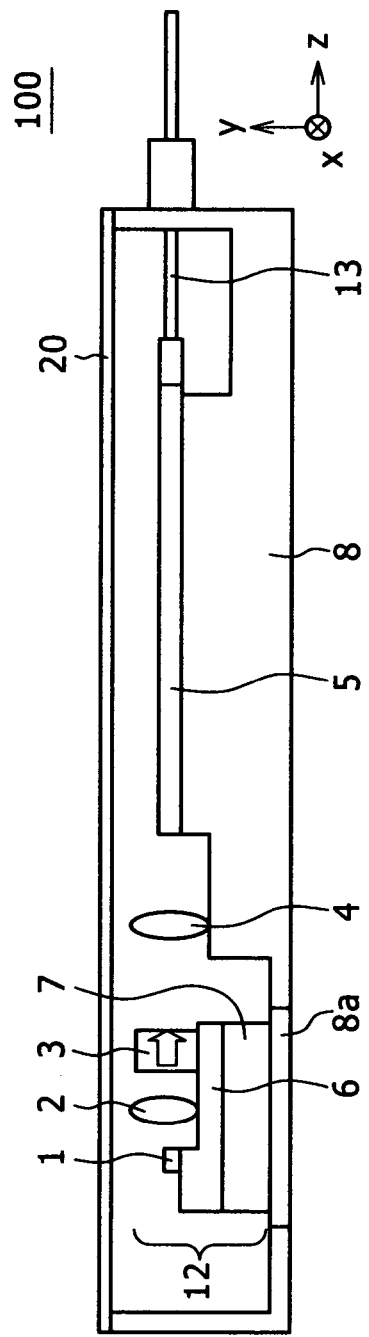
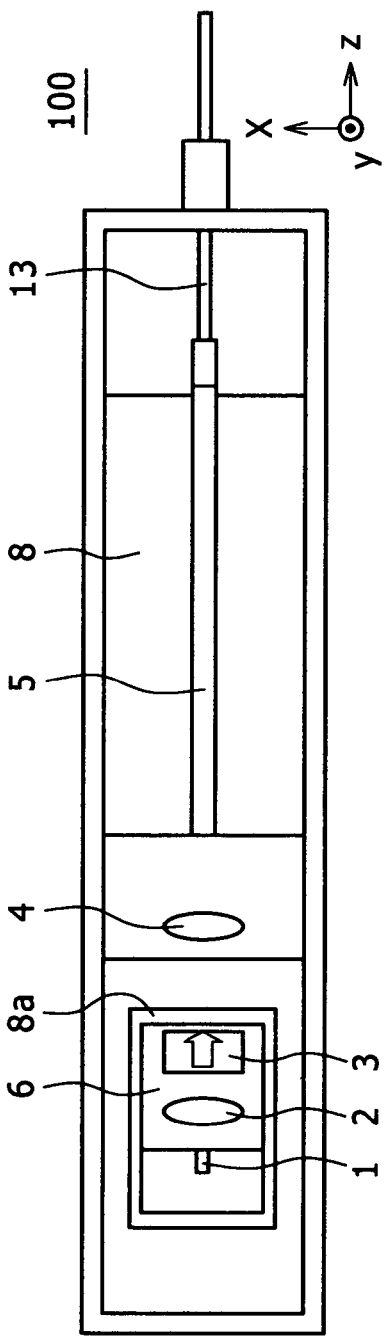
FIG. 1A
FIG. 1B

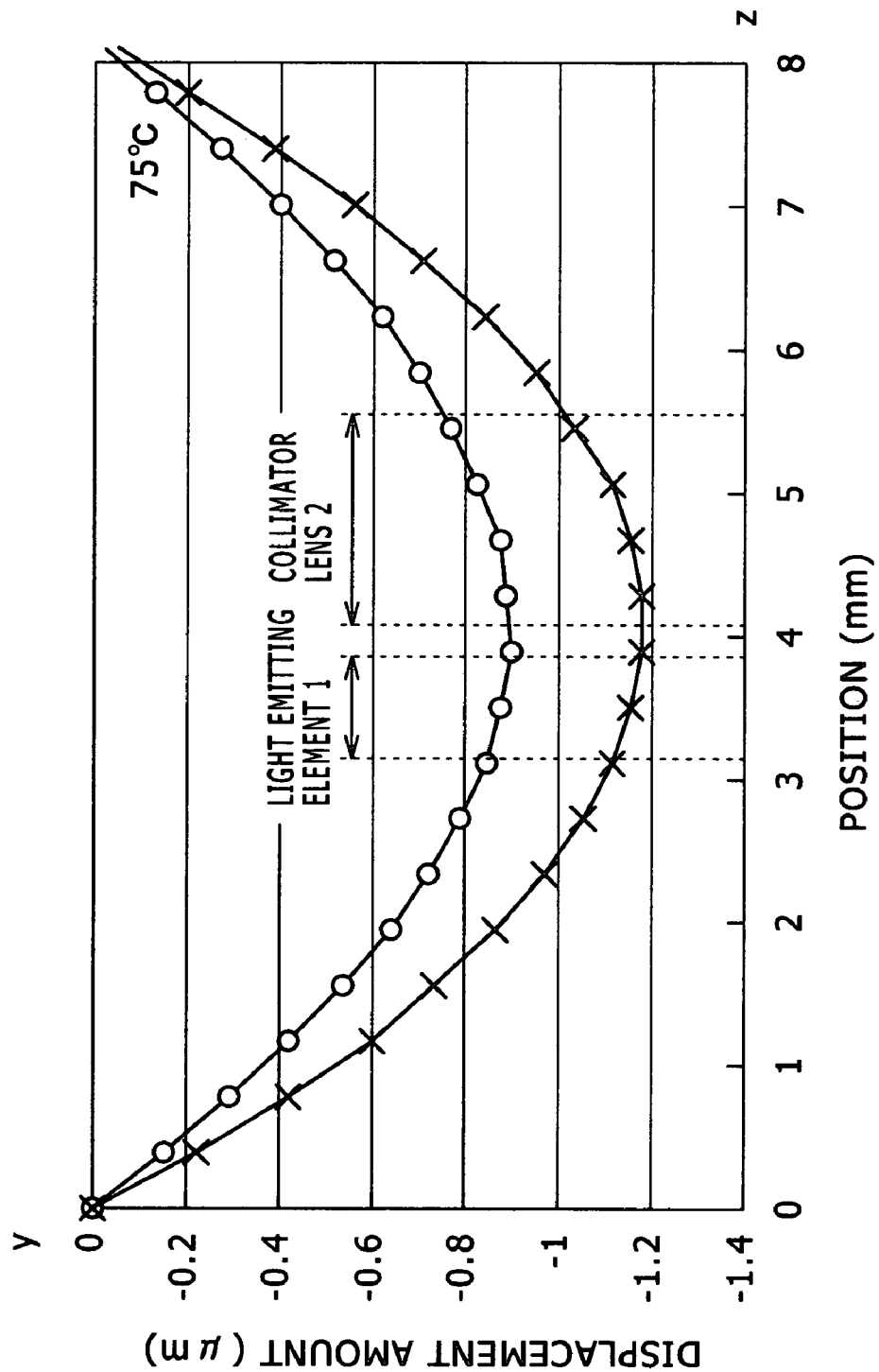

25°C

-25°C

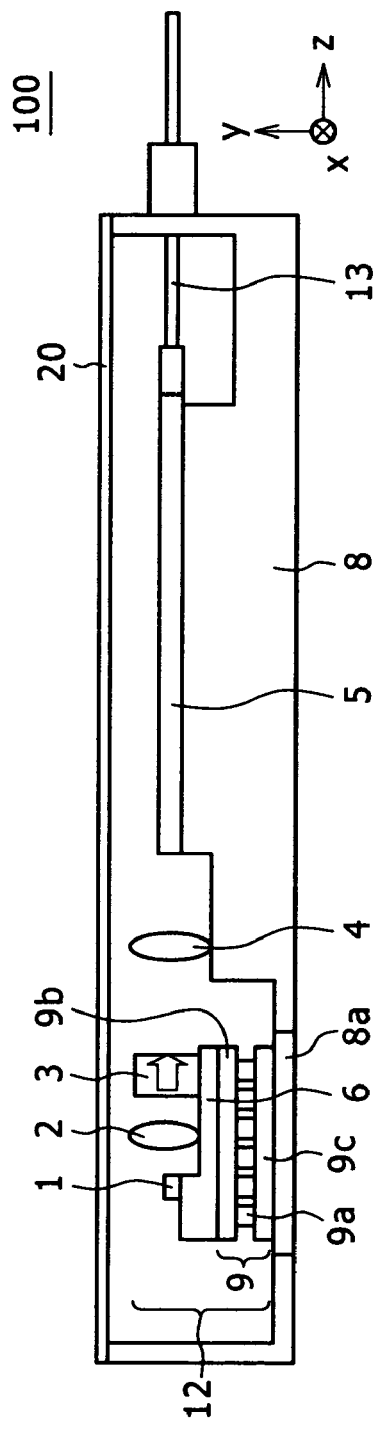
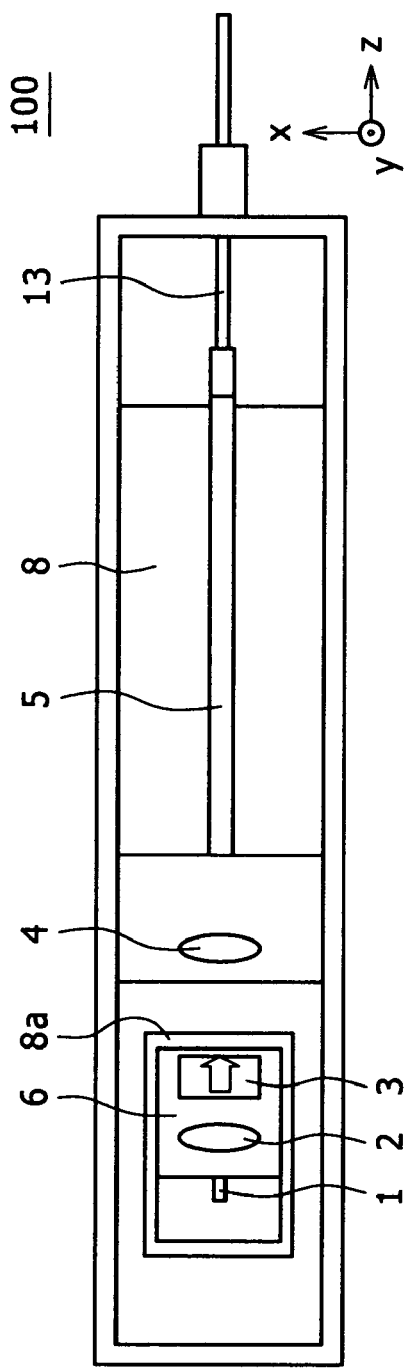

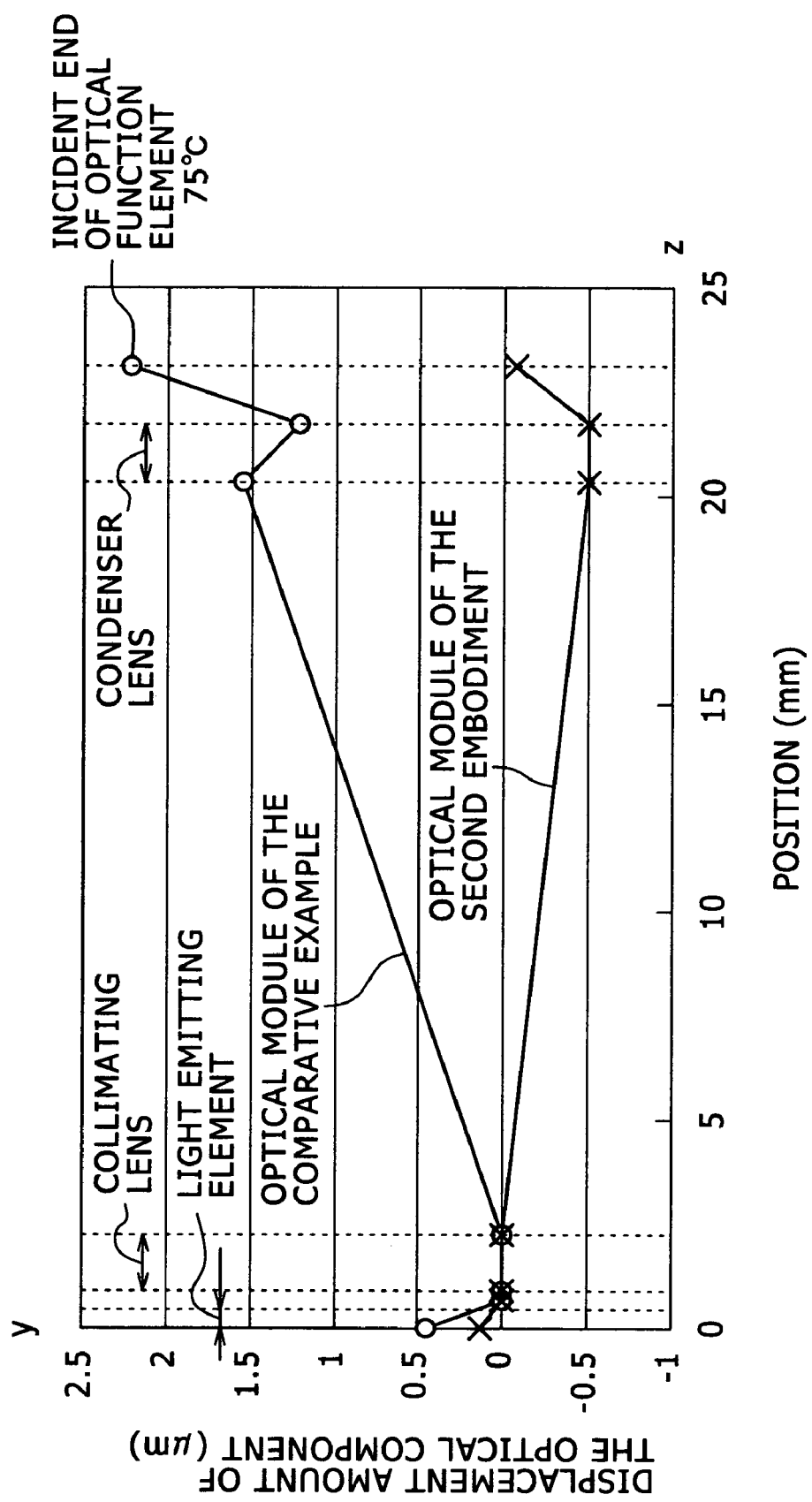

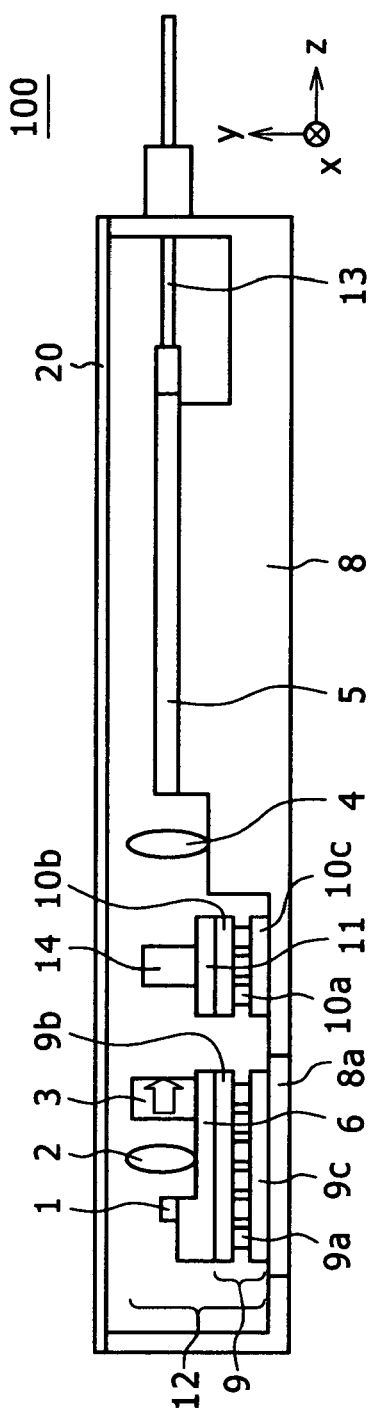
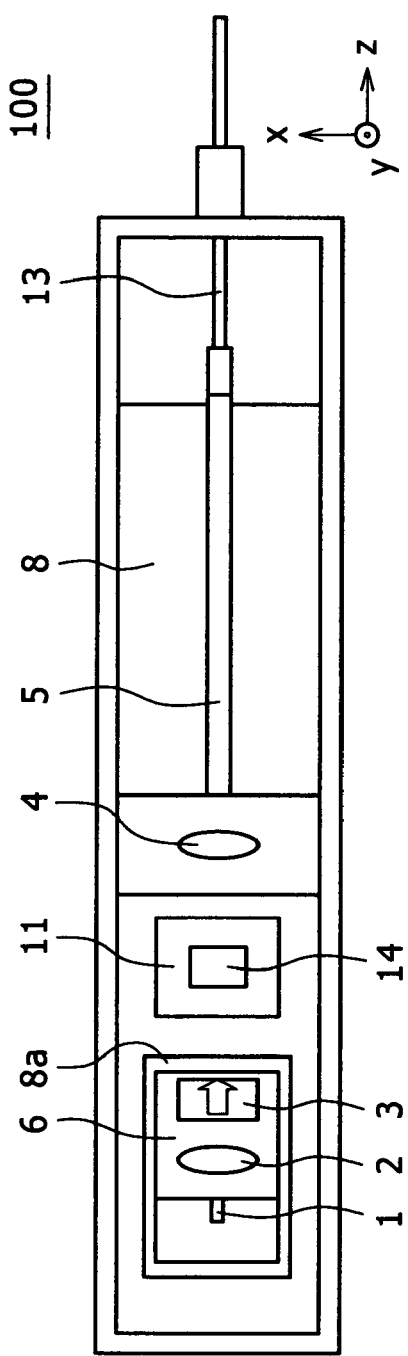
FIG. 7A
FIG. 7B

OPTICAL MODULE

CLAIM OF PRIORITY

The present application claims priority from Japanese application JP 2004-257978 filed on Sep. 06, 2004, the content of which is hereby incorporated by reference into this application.

BACKGROUND OF THE INVENTION

1. Field of the Invention

The present invention relates to an optical module, particularly relates to an optical module used in a high speed region.

2. Description of Related Art

For a modulator in optical communication, an optical function element mainly utilized in a high speed region exceeding the transmission rate of 10 Gbits/s and excellent in high-speed optical modulation characteristics and dispersion-tolerant characteristics has been mounted in a casing separate from a light emitting element remarkably different in a coefficient of thermal expansion.

A light emitting element represented by a semiconductor laser diode is mounted in a package made of substantially the same material as that of the light emitting element in a coefficient of thermal expansion in a state in which it is airtightly sealed. A beam output from the light emitting element is outgoing from a fiber via a condenser lens.

Similarly, an optical function element in which an optical waveguide provided with electro-optical effect represented by lithium niobate ($LiNbO_3$) is formed is also mounted in a package having substantially the similar coefficient of thermal expansion to a coefficient of thermal expansion of the optical function element in a state in which it is airtightly sealed. As for the incoming and outgoing radiation of the optical function element, there are a case that the optical function element is connected to a fiber via a lens and a case that the optical function element is directly connected to a fiber by an optical adhesive.

Generally, an optical function element has dependency upon a direction of polarization. Therefore, to make a beam incident upon the optical function element via a fiber, a polarization maintaining fiber is utilized because polarization is required to be held. If a package for a light emitting element and a package for the optical function element are separate and they are connected, a polarization maintaining fiber on the side of the light emitting element package and a polarization maintaining fiber on the input side of the optical function element package are required to be connected via a connector or to be spliced to each other.

In a conventional type configuration that a light emitting element and an optical function element are housed in separate packages, space for connecting fibers between the packages is required. Besides, as the element and the device are connected via the fibers, maintaining a plane of polarization, the high-priced polarization maintaining fibers and the alignment of polarization are required and the cost is increased. Therefore, the integration of the light emitting element and the optical function element in the same package which contributes to miniaturization and the reduction of the cost is expected.

In a Patent Reference 1 (Japanese Laid-Open Patent Publication No. Hei 11-218648 (No Family)), an optical composite module in which a light emitting element and an optical function element are housed in separate packages and the respective packages are welded is described. In the optical composite module, a polarization maintaining fiber between the light emitting element and the optical function element can be omitted.

Besides, in a Patent Reference 2 (Japanese Laid-Open Patent Publication No. 2001-272572 and its counterpart: US-2002-009265A1), a method of packaging an optical function element module having a structure that an input terminal and an output terminal of an optical function element are fixed to fibers and further the fibers are fixed to a package, is described.

In a Patent Reference 3 (Japanese Laid-Open Patent Publication No. 2000-150745 (No Family)), a package is described which houses an optical semiconductor device having a special radiation plate inserted to be set in its base member made of an iron-nickel alloy or an iron-nickel-cobalt alloy.

In a Patent Reference 4 (Japanese Laid-Open Patent Publication No. 2001-015635 (No Family)), a package is described which houses an optical semiconductor device having a cooling member (an electronic cooling element) inserted to be set in its base member made of an iron-nickel-cobalt alloy or a ceramic such as aluminum oxide sintered body.

Further, in a Patent Reference 5 (Japanese Laid-open Patent Publication No. 2003-273437 (No Family)), a package for an optical semiconductor module is described in which the periphery of a cutout provided to a ceramic base and an electronic cooler are connected.

SUMMARY OF THE INVENTION

When a light emitting element and an optical function element respectively remarkably different in a coefficient of thermal expansion are mounted in the same casing, stress is produced in the light emitting element or the optical function element by a difference from the casing in a coefficient of thermal expansion when ambient temperature varies, and the breakage of the element, deterioration of reliability and a characteristic may be caused. Besides, since a condensing optical system of the light emitting element uses a lens system, displacement occurs in the condensing optical system by variation of the ambient temperature and the optical output of an optical module varies.

To solve the above-mentioned problem, in the invention, a casing of which a coefficient of thermal expansion of the main material is equivalent to that of an optical function element is utilized. Therefore, a conventional type technique can be used for mounting the optical function element. In the meantime, as the coefficient of thermal expansion of a light emitting element is remarkably different from the coefficient of a member of the casing, thermal stress produced in the light emitting element is reduced by embedding a member having the similar coefficient of thermal expansion to that of the material on which the light emitting element is mounted in a region (a position) in which the light emitting element is mounted of the casing and displacement is prevented.

According to the structure disclosed in the invention, the light emitting element and the optical function element respectively remarkably different in a coefficient of thermal expansion which have been heretofore mounted in separate casings can be mounted in the same casing without causing a problem such as the breakage of the element by a difference from the casing in a coefficient of thermal expansion, the deterioration of a characteristic and the displacement of an optical system. As a result, a small-sized reliable optical module can be provided.

BRIEF DESCRIPTION OF THE DRAWINGS

FIGS. 1A and 1B are schematic drawings showing an optical module for explaining a first embodiment of the invention;

FIG. 2 is an explanatory drawing for explaining the distortion of a light emitting element unit in the first embodiment of the invention;

FIGS. 5A and 5B are schematic drawings showing an optical module for explaining a second embodiment of the invention;

FIG. 6 shows a result of simulation showing the displacement of optical components when the ambient temperature is 75° C. for explaining the second embodiment of the invention;

FIGS. 7A and 7B are schematic drawings showing an optical module for explaining a third embodiment of the invention;

DETAILED DESCRIPTION OF THE PREFERRED EMBODIMENTS

Figure 3A:
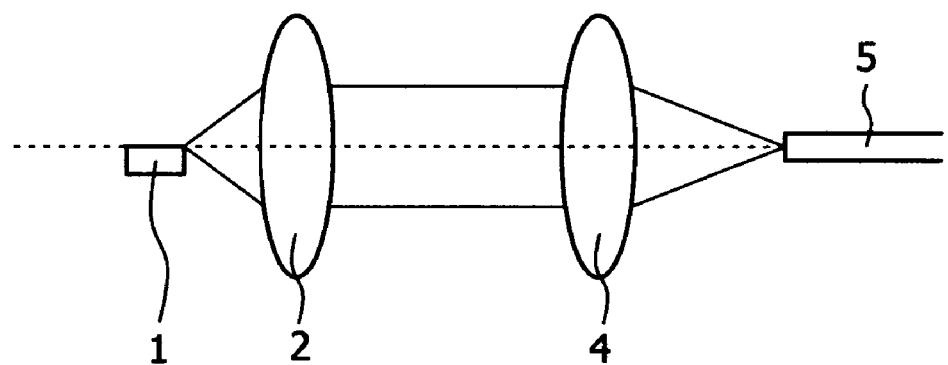
FIGS. 3A and 3B are explanatory drawings for explaining a characteristic of a confocal compound lens system in the first embodiment of the invention.

Referring to the drawings, embodiments of the invention will be described below. In the following embodiments, the same reference number is allocated to equivalent parts and a duplicate description is omitted.

First Embodiment

Figure 3B:
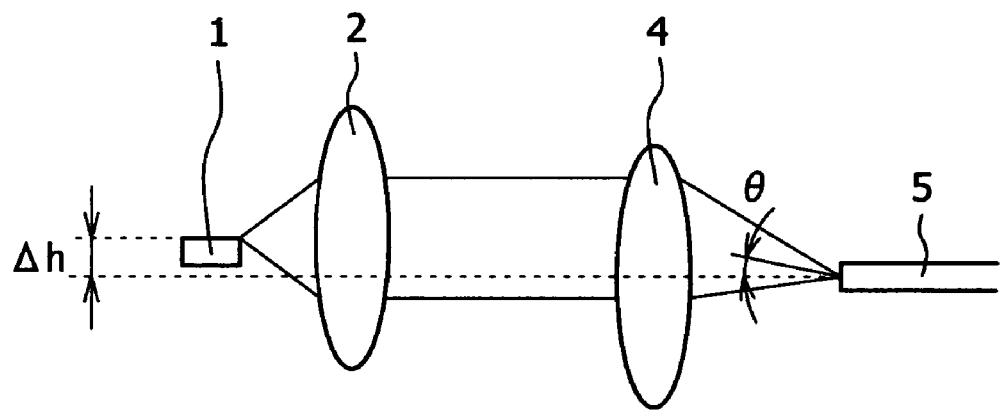
Figure 4A:
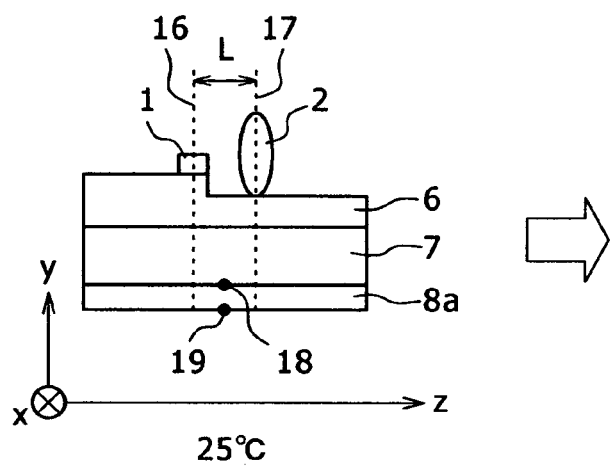
FIGS. 4A and 4B are explanatory drawings for explaining the distortion of a portion embedded in the casing of the optical module equivalent to the first embodiment of the invention and made of different material from the material of the casing (hereinafter also called a dissimilar material-embedded portion)
Figure 4B:
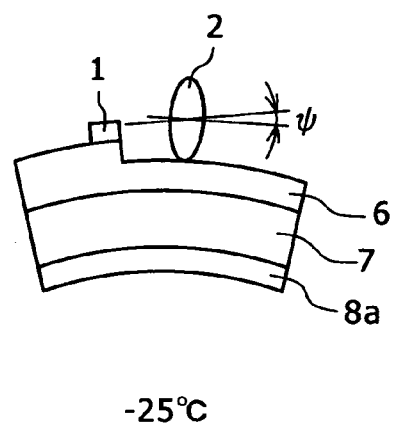

Referring to FIGS. 1A to 4B, a first embodiment of an optical module according to the invention will be described below. FIGS. 1A and 1B are schematic drawings showing the optical module, FIG. 1A is its sectional view, and FIG. 1B is a plan. In FIGS. 1A and 1B and the following drawings, the hatching of a section is omitted. FIG. 2 is an explanatory drawing for explaining distortion by thermal expansion between a light emitting element unit 12 and a casing 8. FIGS. 3A and 3B are explanatory drawings for explaining a characteristic of a confocal compound lens system. FIGS. 4A and 4B are explanatory drawings for explaining the distortion of a portion 8a in which a different type of material is embedded, the distortion caused by a difference in a coefficient of thermal expansion of the casing, FIG. 4A is an enlarged view showing a section around the light emitting element unit 12 put in the atmosphere of 25 degrees C. (centigrade temperature, also denoted by "° C."), and FIG. 4B is an enlarged view showing the section around the light emitting element unit 12 put in the atmosphere of −25 degrees C.

As shown in FIGS. 1A and 1B, the light emitting element unit 12 is configured by a light emitting element 1, a submount 6 and a pedestal 7. The light emitting element 1 is a semiconductor laser made of indium phosphide (InP) and its coefficient of thermal expansion is 4 to 6×10$^{-6}$ [K$^{-1}$] (4 to 6 ppm/K). The light emitting element 1 is soldered on the submount 6 made of aluminum nitride (AlN, a coefficient of thermal expansion: 4.4 ppm/K) having the similar coefficient of thermal expansion. Besides, a collimator lens 2 for making a beam output from the light emitting element 1 parallel light and an optical isolator 3 for preventing return light are mounted on the submount 6. The submount 6 is further soldered on the pedestal 7 to adjust the height of an optical axis. The pedestal 7 is made of a copper-tungsten alloy (a CuW alloy, a coefficient of thermal expansion: 6 ppm/K) and its coefficient of thermal expansion is equivalent to that of the light emitting element 1 and the submount 6. As described above, the coefficient of thermal expansion of each element configuring the light emitting element unit 12 is matched, and the production of thermal stress and the occurrence of distortion respectively by a temperature change are inhibited.

In this embodiment, for main material of the casing 8, SUS304 (18-8 stainless steel, a coefficient of thermal expansion: 16.5 ppm/K) which is similar in a coefficient of thermal expansion to an optical function element 5 made of lithium niobate (a coefficient of thermal expansion: 17.2 ppm/K) is used. Hereby, the production of thermal stress by a temperature change in the optical function element 5 and the occurrence of distortion by a temperature change can be inhibited. In this specification, unless particularly specified, coefficients of thermal expansion are equivalents to a value in a direction of an optical axis.

In the meantime, to inhibit evil influence by a difference in a coefficient of thermal expansion between the light emitting element unit 12 and the casing 8, material having the similar coefficient of thermal expansion to that of the light emitting element unit 12 is embedded in a location of the casing 8 in which the light emitting element unit 12 is mounted. It is desirable that the planar form of the embedded portion 8a is substantially the same as the form of the bottom of the light emitting element unit 12 to reduce as much of the distortion as possible of the casing 8 caused by the difference in the coefficient of thermal expansion between the main material of the casing 8 and the material of the embedded portion 8a. The distortion will be described later.

It is desirable that the embedded portion 8a is made of material having high heat conductivity to enhance thermal radiation. Therefore, in this embodiment, the embedded portion 8a is made of the copper-tungsten alloy. Concretely, a bottom portion for the light emitting element unit 12 of the casing 8 made of SUS304 is exposed by boring working, a plate made of the copper-tungsten alloy and having the same thickness and the same form is fitted into the bored portion, and a junction is acquired by brazing each other.

After the assembly of optical components is finished, a cap 20 made of SUS304 and shown in FIG. 1A is welded and the optical module 100 is completed.

Continuous light outgoing from the light emitting element 1 is made parallel light by the collimator lens 2 in front of it and passes the optical isolator 3 for inhibiting return light. The continuous light that has passed the optical isolator 3 is condensed by a condenser lens 4 and is incident upon an optical waveguide formed on the optical function element 5 and not shown in FIGS. 1A and 1B. The optical function element 5 converts the continuous light to an optical signal by a modulating electric signal not shown. The condenser lens 4 and the optical function element are soldered on a part made of main material of the casing 8.

A single-mode optical fiber 13 is connected to the outgoing side of the optical function element 5 by an optical adhesive. The optical fiber 13 and the casing 8 are sealed and fixed by solder. At this time, to prevent the optical fiber 13 from being disconnected, slack (not shown) equivalent to an amount of extension and contraction caused by a difference in a coefficient of thermal expansion between the optical function element 5 and the casing 8 is provided to the optical fiber 13 between the outgoing end of the optical function element 5 and the casing 8.

The solder described in this specification is not limited to solder having the same melting point, and composition and a melting point according to a manufacturing process are selected.

Next, referring to FIG. 2, a description will be given about the importance of matching the light emitting element unit 12 and the portion 8a made of a different type of material which is embedded in the casing 8 and on which the light emitting element unit 12 is mounted in a coefficient of thermal expansion. FIG. 2 shows the displacement in a direction of the y-axis of the bottom of the portion 8a made of a different type of material measured in the structure shown in FIGS. 1A and 1B of the optical module when a coefficient of thermal expansion of the light emitting element unit 12 is 7 ppm/K, a coefficient of thermal expansion of the portion 8a embedded in the casing 8 and made of different type of material is 10 ppm/K and 12 ppm/K, the difference in the coefficient of thermal expansion between the light emitting element unit and the portion is 3 ppm/K and 5 ppm/K and the ambient temperature of the optical module is varied from 25 degrees C. to 75 degrees C. (the operating temperature of the light emitting element: 25 degrees C.). The displacement of the bottom of the portion 8a made of a different type of material is shown with its both ends as a criterion (a displacement amount=0), values measured in the optical module in which the above-mentioned difference in the coefficient of thermal expansion is 3 ppm/K are plotted by "o (a circle)", and values measured in the optical module in which the above-mentioned difference is 5 ppm/K are plotted by "x (a cross)". The distortion of the portion 8a made of a different type of material by the variation of ambient temperature is caused by the bimetallic effect of the light emitting element unit 12 and the portion 8a made of a different type of material and is also caused by a difference in a coefficient of thermal expansion between the portion 8a made of a different type of material and SUS304 which is the main material of the casing 8 (described later referring to FIG. 4B). As clear from FIG. 2, in the case of 5 ppm/K, compared with the case of 3 ppm/K, the inclination of the collimator lens 2 is 1.3 times larger.

In the optical module, it is important to inhibit the distortion optically in a submicron order. Therefore, to inhibit the displacement of the light emitting element 1 and the collimator lens 2 in the submicron order, it is desirable to inhibit the difference in the coefficient of thermal expansion between the light emitting element unit 12 and the portion 8a made of a different type of material so that the difference is 3 ppm/K or less. Besides, the curvature of the distortion of the portion 8a made of a different type of material has an effect upon displacement ψ in an angle between the optical axis of the light emitting element and the optical axis of the collimator lens 2 (described later referring to FIG. 4B). Therefore, it is desirable to further reduce the curvature.

Generally, it is said that when a difference in a coefficient of thermal expansion between an optical component and a pedestal for mounting the optical component is 5 ppm/K or less, no problem occurs in the optical component. However, for the above-mentioned reason, in the embodiment, the difference in the coefficient of thermal expansion between the light emitting element unit and the portion made of different type of material is limited to 3 ppm/K or less. In this specification, if the difference in the coefficient of thermal expansion between the bonded two members is 3 ppm/K or less, it is considered that the coefficients of thermal expansion of these members are equivalent and are matched.

Next, referring to FIGS. 3A and 3B and FIGS. 4A and 4B, the distortion in a low-temperature region and a high-temperature region of the embedded portion 8a made of the copper-tungsten alloy having a small coefficient of thermal expansion and encircled by the body of the casing 8 made of SUS304 having a large coefficient of thermal expansion and the light emitting element unit 12 connected to the copper-tungsten embedded portion 8a will be described.

The optical module shown in FIGS. 1A and 1B is provided with a confocal compound lenses system using the two lenses of the collimator lens 2 and the condenser lens 4. The characteristic of the confocal compound lenses system is that if the light emitting element 1 and the collimator lens 2 are integrally displaced by Δh in the direction of the y-axis as shown in FIG. 3B, an angle of incidence of a beam upon the optical function element is displaced by θ, however, no variation of a position condensed by the condenser lens 4 is made.

In the optical module shown in FIGS. 1A and 1B, the production of the thermal stress and the occurrence of the thermal distortion of the light emitting element unit 12 caused by the difference in the coefficient of thermal expansion between the light emitting element unit 12 and the casing 8 are inhibited by embedding the material having the coefficient of thermal expansion equivalent to that of the light emitting element unit 12 in the embedded portion 8a made of different type of material. However, the embedded portion 8a is distorted because of a difference in a coefficient of thermal expansion between SUS304 which is the main material of the casing 8 and the copper-tungsten alloy which is a different type of material by embedding the different type of material. To inhibit the deterioration caused by the distortion of optical output, it is effective to arrange the light emitting element 1 and the collimator lens 2 so that they are integrally displaced.

Referring to FIGS. 4A and 4B, arrangement in which the light emitting element 1 and the collimator lens 2 are integrally displaced will be described below. As shown in FIG. 4A, the center 18 in a direction of the z-axis of the pedestal 7 and the center 19 in the direction of the z-axis of the embedded portion 8a are substantially coincident. It is desirable that the center 19 in the direction of the optical axis of the embedded portion 8a is arranged between the light emitting element 1 and the collimator lens 2. It is preferable that a middle point of an interval L between the light emitting element 1 and the collimator lens 2 is substantially coincident with the center 18 in the direction of the optical axis of the pedestal 7. The difference in displacement between the light emitting element 1 and the collimator lens 2 is turned minimum by arranging as described above when the ambient temperature varies. That is, they are integrally displaced. As a result, the input of a beam to the optical function element is deteriorated by the effect of the above-mentioned angular displacement θ and by the effect of angular displacement ψ between the optical axis of the light emitting element 1 and the optical axis of the collimator lens 2 described referring to FIG. 4B. Further, to inhibit the effect of the angular displacement ψ, it is desirable that distance L between the light emitting element 1 and the collimator lens 2 is short, that is, that a lens the focal length of which is short is used for the collimator lens 2. As the result described later and shown in FIG. 8 of simulation, the displacement of the portion in which different type of material is embedded is smaller, compared with the displacement of other portions. However, optically, it is important to also control the distortion in the submicron order.

FIG. 4B exaggeratingly shows the distortion of the light emitting element unit when ambient temperature is −25 degree C. SUS304 which is the main material of the casing 8 has a larger coefficient of thermal expansion, compared with that of the copper-tungsten alloy which is the material of the embedded portion 8a. As a result, SUS304 is contracted more largely than the copper-tungsten alloy by lowering the temperature and applies compressive stress to the copper-tungsten alloy. In the meantime, no stress is directly applied to the light emitting element unit composed of the pedestal 7 mounted on the copper-tungsten alloy and the submount 6. Therefore, the light emitting element unit is distorted in a convex shape upward. As a result, the optical axis of the light emitting element 1 and the optical axis of the collimator lens 2 are displaced by $\psi$.

Conversely, when the ambient temperature is 75 degrees C., tensile stress is applied to the embedded portion 8a from the main material of the casing around the embedded portion. As a result, the light emitting element unit is distorted in a concave shape as shown in FIG. 2.

In any case, it is important to arrange the light emitting element 1 and the collimator lens 2 so that they are integrally displaced and to adopt the collimator lens having short focal length. These are similar in other embodiments.

The material of the light emitting element is not limited to indium phosphide and the light emitting element may also be made of gallium arsenide (GaAs, a coefficient of thermal expansion: 4 to 6 ppm/K). The material of the submount is not limited to aluminum nitride and the submount may also be made of alumina ($Al_2O_3$, a coefficient of thermal expansion: 6.4 to 8.0 ppm/K), a copper-tungsten alloy or an iron-nickel-cobalt alloy (a FeNiCo alloy, a coefficient of thermal expansion: 4.4 ppm/K). The material of the pedestal is not limited to a copper-tungsten alloy and the pedestal may also be made of alumina, aluminum nitride or an iron-nickel-cobalt alloy. The main material of the casing is not limited to SUS304 and the casing may also be made of another alloy including stainless steel (a coefficient of thermal expansion: 14 to 20 ppm/K) or another material matched in a coefficient of thermal expansion. This condition applies to the cap as well.

Lithium niobate is used for the material of the optical function element 5, however, the optical function element may be also made of lithium tantalate ($LiTaO_3$) or lead lanthanum zirconate titanate (PLZT). Besides, there are also a case that an optical component for adjusting the optical axis of a collimated beam, for example a glass plate and a lens, are mounted between the collimator lens 2 and the condenser lens 4 and a case that a beam splitter is mounted to detect optical output power.

In this embodiment, for the function of the optical function element 5, light modulation in which intensity modulation is applied to continuous light to be signal light is described, however, the embodiment is not limited to this and it includes a switch using an electro-optic effect, a polariscope and a wave changing switch using nonlinear optical effect. The light modulation includes not only intensity modulation but phase modulation and polarization modulation.

A transformed embodiment of the above-mentioned first embodiment can be similarly applied to the following other embodiments.

According to this embodiment, the small-sized optical module in which the light emitting element and the optical function element can be housed in the same casing can be acquired. Besides, the low-priced optical module in which no polarization maintaining fiber is required between the light emitting element and the optical function element can be acquired. Further, the optical module hardly distorted by the variation of ambient temperature and having satisfactory characteristics can be acquired.

Second Embodiment

Referring to FIGS. 5A and 5B and FIG. 6, an optical module equivalent to a second embodiment of the invention will be described below. FIGS. 5A and 5B are schematic drawings showing the optical module, FIG. 5A is a sectional view and FIG. 5B is a plan. FIG. 6 shows a result of simulation having 0 in the displacement of a collimator lens as a criterion and showing the displacement, from the position at 25 degrees C., in a direction of the y-axis of each optical component at 75 degrees C.

In the optical module shown in FIGS. 5A and 5B, a light emitting element 1 is mounted over a thermoelectric module 9 using a Peltier device. A light emitting element unit 12 is configured by the light emitting element 1, a submount 6 and the thermoelectric module 9. The submount 6 is soldered on the thermoelectric module 9 to adjust the temperature of the light emitting element 1 and to enhance the stability of its output wavelength. The thermoelectric module 9 is composed of a thermoelectric device 9a made of BiTe and others having the Peltier effect and substrates 9b, 9c for outgoing radiation for holding the thermoelectric device from the upside and the downside. The radiation plates 9b, 9c of the thermoelectric module 9 are alumina substrates on which feeding wiring for the thermoelectric device 9a is provided and have the similar coefficient of thermal expansion to those of the light emitting element 1 and the submount 6. As described above, in the second embodiment, coefficients of thermal expansion are also matched in the light emitting element unit.

FIG. 6 shows displacement amounts of the light emitting element 1, the collimator lens 2, a condenser lens 4 and an incident end of an optical function element 5 respectively in the optical module 100 equivalent to the second embodiment when ambient temperature varies from 25° C. to 75° C. (the operating temperature of the light emitting element: 25° C.) with the collimator lens 2 as a criterion (displacement 0). The axis of an abscissa shows a position (unit: mm) in a direction of the z-axis having an origin at the rear end of the light emitting element and the axis of an ordinate shows displacement (unit: μm) in the direction of the y-axis with the collimator lens 2 as displacement 0. Operation is executed only in a plotted position and plotted positions are tied by a straight line. As a comparative example, the structural analysis simulation of the optical module in which the same optical components as those in the second embodiment are mounted and a casing 8 is all made of SUS304 is made. It is known from the result shown in FIG. 6 that in the structure in the second embodiment, the displacement amounts of the optical components are far smaller than those in the comparative example. Particularly, the displacement amounts of the condenser lens 4 and the incident end of the optical function element 5 are significantly smaller than those in the comparative example. As described above, it can be said that it is effective to adopt configuration in the second embodiment so as to reduce the displacement of the optical components by the variation of temperature and inhibit the deterioration of optical output.

The radiation plates 9b, 9c are made of alumina, however, the embodiment is not limited to this and one or both may be made of aluminum nitride. This is similar in the following embodiments.

According to this embodiment, the small-sized optical module in which the light emitting element and the optical function element can be housed in the same casing can be acquired. Besides, the low-priced optical module in which no polarization maintaining fiber is required between the light emitting element and the optical function element can be acquired. Further, the optical module hardly distorted by the variation of ambient temperature and having satisfactory characteristics can be acquired. The optical module in which the thermoelectric module is provided and an optical wavelength is stable can be acquired.

Third Embodiment

Figure 8:
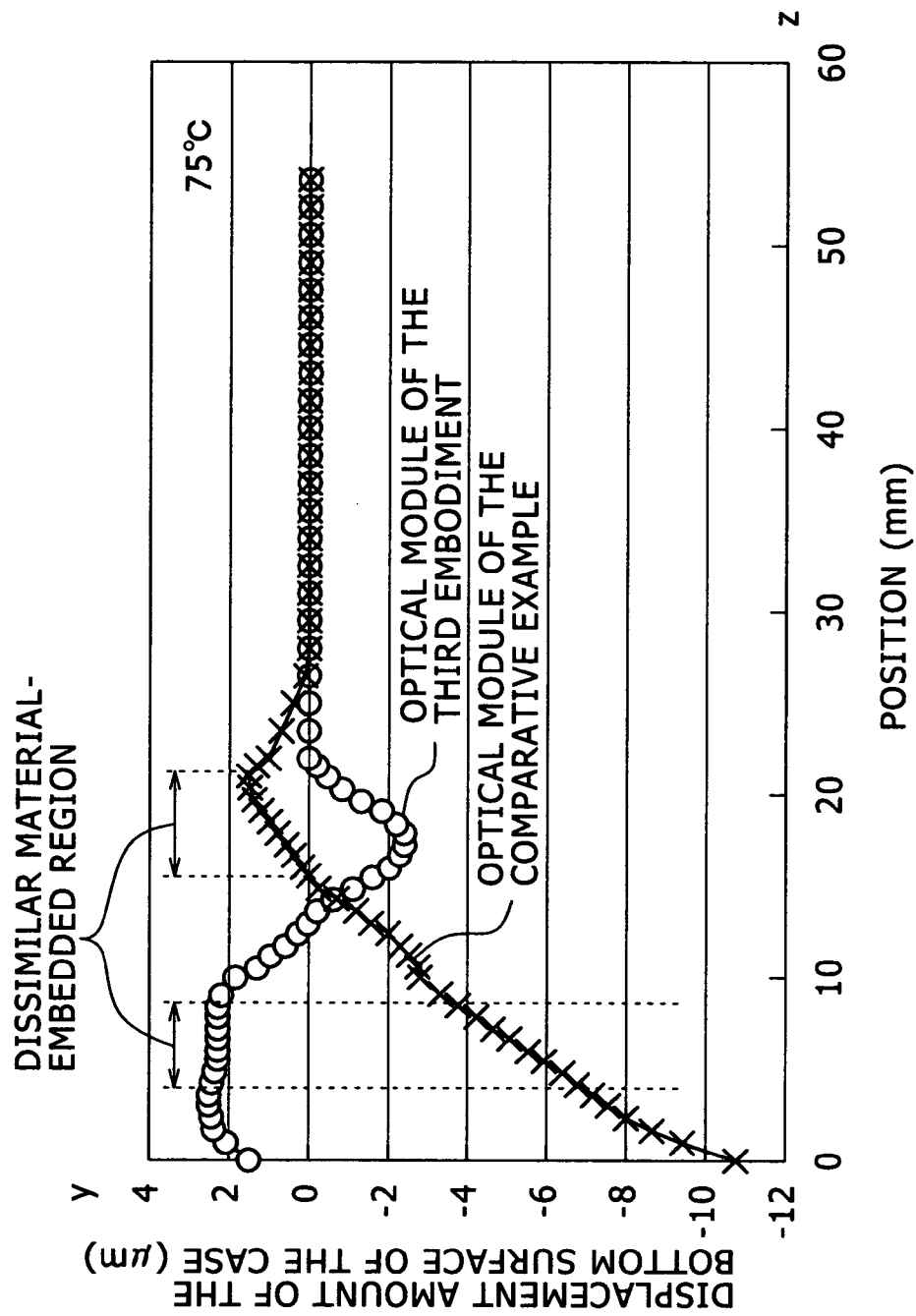
FIG. 8 shows a result of simulation showing the displacement of the bottom of a casing when the ambient temperature is 75 degrees C. for explaining the third embodiment of the invention.

Referring to FIGS. 7A and 7B and FIG. 8, an optical module equivalent to a third embodiment of the invention will be described below. FIGS. 7 are schematic drawings showing the optical module, FIG. 7A is a sectional view, and FIG. 7B is a plan. FIG. 8 shows a result of simulation showing the displacement in a direction of the y-axis of the bottom of a casing at 75 degrees C. from the position at 25 degrees C. with the bottom of the casing on which an optical function element is mounted as a criterion of displacement 0.

The optical module shown in FIGS. 7A and 7B is different from the optical module shown in FIGS. 5A and 5B in that a wavelength locker 14 is provided between an isolator 3 and a condenser lens 4. The wavelength locker 14 is an optical component for monitoring the wavelength of an incident beam, and a wavelength of a beam emitted from a light emitting element 1 is fixed by a control circuit not shown in FIGS. 7A and 7B. In the wavelength locker 14, an incident beam is led to an etalon filter and the intensity of the beam before and after passing the etalon filter is monitored by two photodiodes. The wavelength locker 14 emits no heat differently from the light emitting element 1, however, the temperature is required to be controlled to control a monitored wavelength.

Therefore, the wavelength locker 14 is soldered on a submount 11, the submount 11 is soldered on a thermoelectric module 10, and the thermoelectric module 10 is also soldered to a main-material part of the casing 8.

A beam emitted from the light emitting element 1 is made parallel light by a collimator lens 2 in front of the light emitting element and is incident upon the wavelength locker 14 via the optical isolator 3 for inhibiting return light. The beam passing the wavelength locker 14 is incident upon an optical waveguide formed on the optical function element 5 by the condenser lens 4. To inhibit the distortion of the casing 8 caused by different in a coefficient of thermal expansion between the main material of the casing 8 and the material of an embedded portion 8a, the embedded region is required to be reduced. Besides, to efficiently radiate the heat of the light emitting element 1, in this embodiment, a different type of material is embedded only in a location in which the light emitting element 1 that generates heat by itself is mounted over the thermoelectric module 9. The form of a bonded face of the embedded portion 8a is substantially the same as the form of a bonded face of the heat exchange substrate 9c of the thermoelectric module 9. The embedded portion 8a is made of a copper-tungsten alloy having high heat conductivity.

The result of structural analysis simulation in the optical module equivalent to the third embodiment when the ambient temperature varies from 25 degrees C. to 75 degrees C. (the operating temperature of the light emitting element: 25 degrees C., the operating temperature of the wavelength locker: 35 degrees C.) will be described below. In FIG. 8, the axis of an abscissa shows a position (unit: mm) in the direction of the z-axis with the end of the casing as a criterion and the axis of an ordinate shows the displacement amount in the direction of the y-axis of the bottom of the casing 8 in the optical module equivalent to the third embodiment. FIG. 8 also shows a comparative example that structural analysis simulation is made in an optical module in which the same optical components as those in the third embodiment are provided and a copper-tungsten alloy is also embedded in a location where the thermoelectric module 10 is mounted. In the comparative example shown in FIG. 8, a part in which a light emitting element unit is mounted is inclined by 3 μm. As a result, it is known that it is necessary to reduce as much of the area as possible of the dissimilar material-embedded portion 8a in the casing 8. It is also known that respective forms of the dissimilar material and a radiation plane of the thermoelectric module are substantially equal to each other.

According to this embodiment, the small-sized optical module in which the light emitting element and the optical function element can be housed in the same casing can be acquired. Besides, the low-priced optical module in which no polarization maintaining fiber is required between the light emitting element and the optical function element can be acquired. Further, the optical module hardly distorted by the variation of ambient temperature and having satisfactory characteristics can be acquired. The optical module in which the wavelength locker is provided and the wavelength of a beam is further stable can be acquired.

Fourth Embodiment

Figure 9:
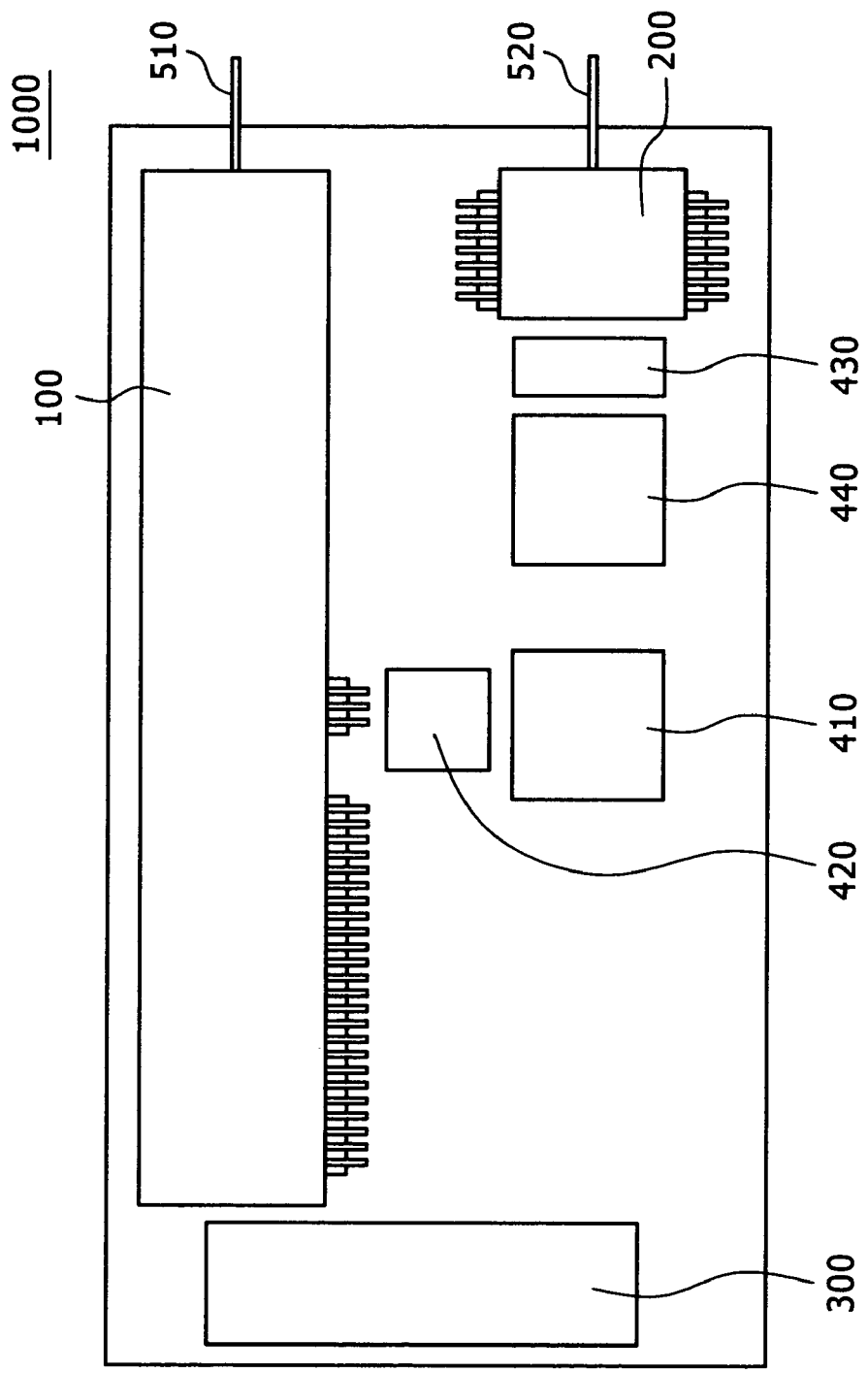
FIG. 9 is a plan showing an optical transceiver for explaining a fourth embodiment of the invention.

Next, referring to FIG. 9, a transceiver module equivalent to a fourth embodiment which is another embodiment of the invention will be described. FIG. 9 is a plan showing the transceiver module for explaining the fourth embodiment of the invention.

An optical transceiver 1000 shown in FIG. 9 is configured by the optical module 100 for transmission described in the third embodiment, a light receiving element module 200 and their peripheral circuits. Electric signals which are input via four signal conductors (not shown) from a connector 300 and the transmission rates of which are 2.4 Gbits/s (giga bits per second) are multiplexed into a signal the transmission rate of which is 10 Gbits/s in IC for multiplexing 410, the multiplexed signal is sent to the light emitting element module 100 via a driving IC 420 for sending a modulating signal to an optical function element (not shown) operating as a modulator, and an optical signal the transmission rate of which is 10 Gbits/s is sent to an optical fiber 510.

In the meantime, an optical signal which is sent via an optical fiber 520 and the transmission rate of which is 10 Gbits/s is converted to an electric signal in the light receiving element module 200, the electric signal is demultiplexed into four signals the transmission rates of which are 2.4 Gbits/s in IC for demultiplexing 440 via an IC 430 for amplification, and the four signals are sent out from the connector 300.

As in the optical transceiver equivalent to this embodiment, the optical module 100 in which the optical function element excellent in a broad-band and high-speed modulation characteristic and a dispersion-resistant characteristic and a light emitting element are housed in one package is used, and therefore the small-sized optical transceiver can be acquired.

The optical transceiver equivalent to this embodiment may also be an optical transmitter module in which a light emitting element module and its peripheral circuit are mounted on a substrate.

The optical transceiver and the optical transmitter module are both an optical module.

According to this embodiment, the small-sized optical transceiver can be acquired by using the small-sized optical module for transmission in which the light emitting element and the optical function element are housed in the same casing. Besides, the low-priced optical transceiver can be acquired by using the low-priced optical module for transmission in which no polarization maintaining fiber is required between the light emitting element and the optical function element. Further, the optical transceiver having satisfactory characteristics can be acquired by using the optical module for transmission hardly distorted by the variation of ambient temperature and having satisfactory characteristics. The optical transceiver having satisfactory characteristics can be acquired by using the optical module for transmission in which the thermoelectric module is provided and the wavelength of a beam is stable.

The invention can be applied to a field of optical communication such as an optical transmission module. Particularly, the invention can be effectively applied to the optical module in which the light emitting element and the optical function element represented by an optical modulator are mounted in the same casing.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. An optical module in which a light emitting element and an optical function element for receiving a beam from the light emitting element are housed in a metallic casing, wherein:

said metallic casing is configured by a first member on which the optical function element is mounted and a second member on which the light emitting element is mounted; and the first member is first-alloy part made of stainless steel and the second member is a second-alloy part is made of a copper-tungsten alloy.

2. The optical module according to claim 1, wherein:

said light emitting element is mounted on a submount; and said submount is further connected to the second member via a pedestal.

3. The optical module according to claim 2, wherein:

respective forms of each bonded faces of the second-alloy portion and the pedestal are substantially equal to each other.

4. The optical module according to claim 2, wherein:

a lens for collimating a beam from the light emitting element is further mounted on the submount; and the center in a direction of the optical axis of the second member is located between the light emitting element and the lens.

5. The optical module according to claim 1, wherein:

said light emitting element is mounted on a submount; and said submount is further connected to the second member via a thermoelectric module.

6. The optical module according to claim 5, wherein:

respective forms of bonded faces of the second member and a radiation plate of the thermoelectric module are substantially equal to each other.

* * * * *